(12) United States Patent
Rawson, III

(10) Patent No.: US 6,920,554 B2
(45) Date of Patent: Jul. 19, 2005

(54) PROGRAMMING NETWORK INTERFACE CARDS TO PERFORM SYSTEM AND NETWORK MANAGEMENT FUNCTIONS

(75) Inventor: Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 09/738,581

(22) Filed: Dec. 18, 2000

(65) Prior Publication Data

US 2002/0078318 A1 Jun. 20, 2002

(51) Int. Cl.[7] .......................... G06F 13/00; G06F 13/10
(52) U.S. Cl. .............................. 713/100; 713/1; 713/2; 709/221; 709/223; 711/205
(58) Field of Search ................. 713/1, 2, 100; 711/205; 709/221, 223

(56) References Cited

U.S. PATENT DOCUMENTS 6,298,057 B1 * 10/2001 Guy et al. ................... 370/389
6,625,119 B1 *  9/2003 Schuster et al. ............ 370/230
6,711,607 B1 *  3/2004 Goyal ........................ 709/203

OTHER PUBLICATIONS

RD 429004A, Jan. 2000, Derwent, Anonymous.*

* cited by examiner

Primary Examiner—Rehana Perveen
(74) Attorney, Agent, or Firm—Casimer K. Salys; Dillon & Yudell LLP

(57) ABSTRACT

Disclosed is a server farm or MetaServer environment in which thin servers or server appliances each include a programmable network interface card providing logic required for implementing service processor functions. The combined implementation of the network interface and service processor hardware and software substantially eliminates redundancies, which previously existed when both were separate components. Service processor functions that are provided on the programmable network interface card includes gathering sensor data about the hardware, forwarding alerts regarding hardware state, initiating shutdown and restart on command, and responding to operating system service processor inquiries and commands. Additionally, other low-level management and control functions are provided on the programmable network interface card. Also, in one embodiment, a re-partitioning of the functions between the service processor (or probes) and the network interface is provided.

19 Claims, 4 Drawing Sheets

PROGRAMMING NETWORK INTERFACE CARDS TO PERFORM SYSTEM AND NETWORK MANAGEMENT FUNCTIONS

RELATED APPLICATIONS

The present invention is related to the subject matter of co-pending U.S. Pat. application Ser. No. 09/738,578 entitled "A Simple Liveness Protocol Using Programmable Network Interface Cards" filed concurrently herewith.

BACKGROUND OF THE INVENTION

1. Technical Field

The present invention relates in general to networks of computer systems and devices and in particular to the use of programmable network interface cards or logic within such networks. Still more particularly, the present invention relates to the use of programmable network interface cards to provide additional functions including service processor functions.

2. Description of the Related Art

There is a desire within the computer network industry to provide more efficient ways to manage a farm or cluster of thin servers or server appliances being utilized for web-based application service as a single system while maintaining multiple execution images.

Currently, server systems that require management often contain service processor cards with a standard microprocessor, local memory, and a standard bus interface. Additionally, the server systems usually include an interface to a specialized management bus located on the server system planar. State-of-the-art examples of service processor cards include the Wiseman card manufactured by International Business Machines Corporation for Netfinity and related products, integrated implementations of the same function, and the Emergency Management Processor (EMP) card manufactured by Intel Corporation. Another example is the implementation by Intel Corporation of the management bus, baseboard management controller and processor, and emergency management port on the system planar.

However, the above implementations exhibit several disadvantages when utilized with thin servers. A first disadvantage is that extra logic is added to the server system either as a discrete card or integrated on the planar. The extra logic raises the cost of the system, consumes physical space, and increases the power consumption heat within the enclosure. A second disadvantage is that when implemented as a discrete card, the service processor card utilizes a bus slot, usually on the PCI bus, which has a limited number of bus slots available. Finally, a third disadvantage is exhibited because the service processor implementations all have one or more private interfaces that must be externalized by external cabling. The external cabling increases the amount of space and the overall number of cables required. Often, the network connection that is utilized is a serial network connection that requires concentrators, and thus utilizes an even larger number of cables, making the network cumbersome to configure and manage.

Current server systems with a service processor implementation (card or integrated) contain both a general network interface and the service processor, which, in turn, has a private network interface that is typically a serial one, as noted above. The network interface card is an input/output (I/O) device, usually attached by an I/O bus to processor and memory, while the service processor is attached not only to the I/O bus but also to a bus such as the Inter-Integrated Circuit ($I^2C$) bus that gives it access to hardware sensor information such as power levels, temperatures, fan speeds and so forth.

Typically, both the network interface card (or logic) and the service processor are programmable, and since the service processor is connected to the external world through one or more communications interfaces, both have physical network connectors and network hardware and software implementations. Also, the network interface card has to be "awake" enough to respond to wake-on-LAN packets, and the service processor generally supports an interface for powering-up the system. Thus, both require some form of always-active logic and partial power.

Also related to the present invention is "SPINE" work on programming network interfaces cards being done at the University of Washington. SPINE supports programming the network interface cards and concentrates on moving communications protocol processing from the operating system to the network interface card. Like the other systems described above, the SPINE requires a separate network for management.

The present invention recognizes that it would be a welcomed improvement to remove the hardware and software redundancies inherent with separate network interface and service processor components. The present invention further recognizes that it would be particularly desirable to incorporate the service processor and network interface functions into a programmable network interface card to reduce the duplication of hardware in a thin server or server appliance environment. These and other benefits are provided by the present invention.

SUMMARY OF THE INVENTION

Disclosed is a clustered server appliance or thin server environment in which the thin servers include a programmable network interface card or logic providing the environment used to implement the service processor functions. The combined implementation of the network interface and service processor hardware and software substantially eliminates redundancies, which previously existed when both were separate components. Service processor functions that are provided on the programmable network interface card include (1) gathering sensor data about the hardware, (2) forwarding alerts regarding hardware state, (3) initiating shutdown and restart on command, and (4) responding to operating system service processor inquiries and commands.

Additionally, other low-level management and control functions are provided on the programmable network interface card.

Also, in one embodiment, a re-partitioning of the functions between the service processor (or probes) and the network interface is provided.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
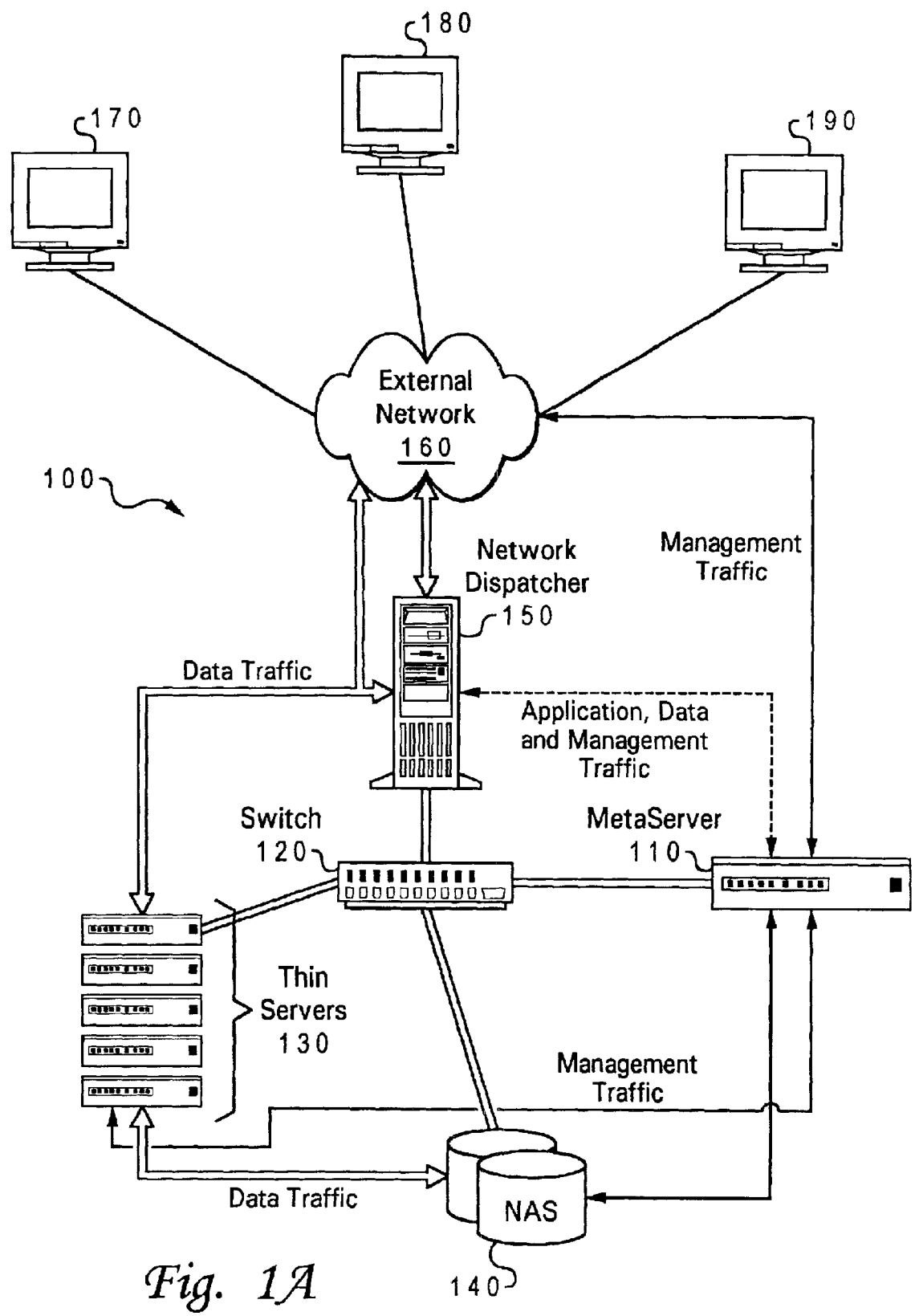
FIG. 1A depicts a block diagram of a cluster or farm of server appliances in which a preferred embodiment of the invention may be advantageously implemented.

With reference now to the figures and in particular with reference to FIG. 1A, a server farm environment having thin servers or server appliances that comprise a distributed data processing system is illustrated. The environment shown in the figure is referred to in this document variously as the MetaServer environment or as a cluster or farm of thin servers or server appliances.

The distributed data processing system includes a MetaServer 110 (i.e., a management server), a switch 120, one or more thin servers 130, network attached storage (NAS) 140, network dispatcher 150, external network 160, and one or more client devices 170-190. The MetaServer 110, switch 120, thin servers 130, NAS 140 and network dispatcher 150 are part of a local area network 100 coupled with the external network 160. In FIG. 1A, data flow is denoted by lines having arrow heads while actual physical connections are denoted by solid lines. In actuality, all data packets are routed through the switch 120.

The distributed data processing system shown in FIG. 1A is illustrative only. The particular architecture and elements shown in FIG. 1A are not intended to place any limitations on the architecture and elements used with the present invention. Rather, the distributed data processing system may have many other architectures and may include other elements in addition to, or in replacement of, the elements shown in FIG. 1A without departing from the spirit and scope of the present invention.

In the server farm environment of FIG. 1A, the thin servers 130 provide specialized applications to client devices 170–190 via the external network 160 and the network dispatcher 150. The thin servers 130 may provide any number of different applications, including print applications, database applications, web-serving applications, and the like.

The external network 160 may be any type of data network known to those of ordinary skill in the art. The external network 160 may be, for example, the Internet, an intranet, a wide area network (WAN), local area network (LAN), wireless data network, satellite data network, or the like. The external network 160 may also be any combination of the above.

The client devices 170–190 may be any type of computing device capable of accessing the thin servers 130 via the external network 160 and the network dispatcher 150. The client devices 170–190 may be, for example a personal computer, laptop computer, personal digital assistant (PDA), data network capable wireless communication device, and the like. The client devices 170–190 may access applications provided by the thin servers 130 using, for example, a web browser application or the like.

The network dispatcher 150 performs workload balancing with regard to the thin servers 130 with the goal being to avoid looking at every packet, especially every packet sent back by the thin servers 130. The network dispatcher 150 dispatches jobs or transaction requests to the thin servers 130 and the NAS 140. The network dispatcher 150 essentially provides a mechanism through which job or transaction requests may be sent to applications running on the thin server 130. The responses to these job or transaction requests are supplied directly by the thin servers 130 through the switch 120 to the external network 160 and hence to the clients 170–190.

The NAS 140 is a specialized file server that connects to the network. The NAS 140 uses traditional local area network (LAN) protocols, such as Ethernet and TCP/IP and processes only file I/O requests such as Network File System (NFS) (UNIX) and Server Message Block (SMB) (DOS/Windows).

The switch 120 is an electronic device that directs the flow of data from one side of the switch to the other. The switch 120 may be any type of data switching device known to those of ordinary skill in the art. For example, the switch 120 may be an Ethernet switch, a hub, a router, or the like. The switch 120 serves to route data and message traffic to appropriate devices 110, 130, 140 and 150.

The MetaServer 110 performs the function of managing the devices in the local area network (e.g., the switch 120, the thin servers 130, the NAS 140 and the network dispatcher 150. In managing these devices, what is meant is that the MetaServer 110 performs management functions including collecting data to maintain statistics of historical interest and to monitor the current state of the devices. The MetaServer 110 may be a server, as is generally known in the art, or may be a specialized thin server that is used to perform management functions. In the depicted example, the MetaServer 110 is a specialized thin server.

Figure 1B:
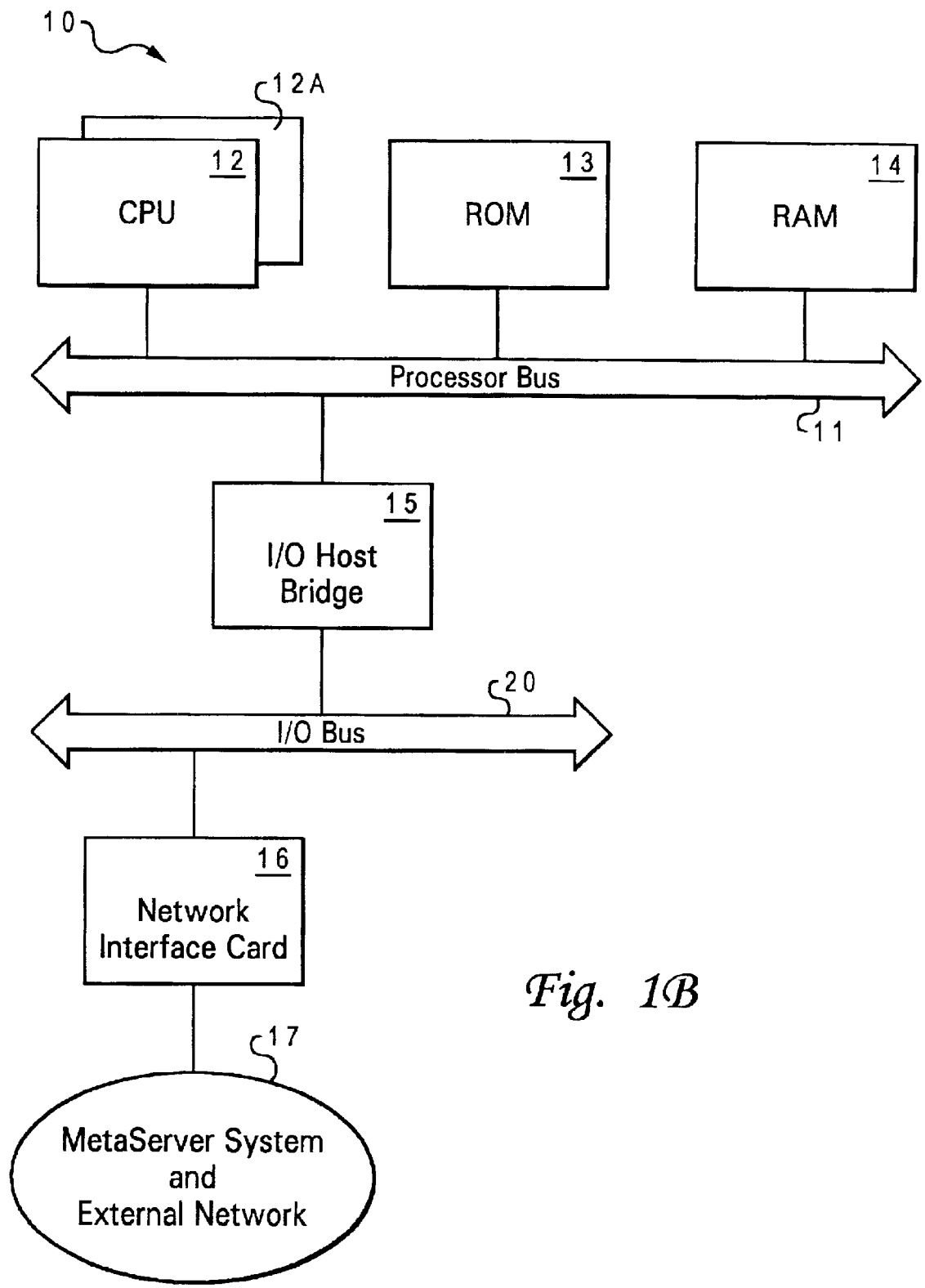
FIG. 1B is a block diagram representation of the component parts of a data processing system that may be utilized within a preferred embodiment of the invention.

Referring now to FIG. 1B, there is illustrated an exemplary embodiment of a thin server or server appliance, in which some features of the present invention may be implemented. The present invention may, however, be implemented in other types of computer system configurations that may be utilized as thin servers or server appliances and management servers. As shown, computer system 10 has a processor (CPU) 12, a read-only memory (ROM) 13, and a read-write Random-Access Memory (RAM) 14 connected to a processor bus 11. Optionally, computer system also includes additional CPUs 12A. CPU 12, ROM 13, and RAM 14 are also coupled to Input/Output (I/O) bus 20 of computer system 10 through I/O host bridge 15. I/O host bridge 15 provides a low latency path through which processor 12 may directly access I/O devices mapped anywhere within bus memory or I/O address spaces. I/O host bridge 15 also provides a high bandwidth path for allowing I/O devices to directly access RAM 14.

Also attached to I/O bus 20 is network interface card (or logic) 16, hereinafter collectively referred to as network interface card 16. Network interface card 16 is of a programmable form and provides the function and hardware to connect computer system 10 to a network 17, such as MetaServer environment described herein. Additional devices, including other bridged busses, may also be attached to I/O bus 20. In the preferred embodiment, each system of the MetaServer environment (i.e., the MetaServer and targets/servers) is implemented by a computer system 10 with associated programmable network interface card 16. Although not shown in FIG. 1B, each system is assumed to run a copy of an operating system (OS) as well as one or more application programs or servers.

The present invention eliminates the hardware and software redundancies that exist with separate network interface card and service processors in a cluster or farm of server appliances by integrating the functions of a service processor (previously provided by card or motherboard logic) into a programmable network interface card. The invention finds applicability particularly in cost and size constrained server systems, such as thin servers, being utilized to provide web-based application service as a single system while maintaining multiple execution images. However, other server systems are contemplated within the scope of the invention.

The invention makes use of the ability to program programmable network interface cards utilized within the server systems. To accomplish the management and control functions of the service processor, the network interface card is provided with specific hardware connection to the other hardware components in the server such as, for example, direct access to the Inter-Integrated Circuit ($I^2C$) bus.

The present invention utilizes the programmability of modern, high-speed network interfaces that have standard, or close-to-standard, microprocessors and some amount of local memory. For example, both the Intel Pro 10/100 Ethernet and the Alteon WebSystems ACENic have these features. Additionally, since these interfaces provide automatic power-on capabilities such as wake-on-LAN, they are always at least partially active in much the same way as the current generation of service processor implementations.

Further, the network interface's primary function of providing access to the external network, ensures that the programmable network interface card already posses a connector and cabling to the external network. Thus, the present invention takes advantage of these features that enable the programming of the network interface card with service processor logic, allowing the network interface card to operate not only as a network interface, but also as a service processor. Thus, the need for a separate connection for management and control functions is eliminated.

In the preferred embodiment, the functions that are programmed provide the current level of service processor operations including gathering sensor data about the hardware; forwarding alerts regarding hardware state; initiating shutdown and restart on command; and responding to operating system service processor inquiries and commands.

Moreover, assuming there is sufficient memory capacity in the logic of the programmable network interface card, the present invention extends the current level of management and control functions to include additional features such as low-level network statistics gathering, low-level network liveness testing and failure detection, and forwarding of information gathered from the operating system and application subsystem software, including the generation of software alerts. Many of these features cannot be implemented with the current generation of service processors.

Figure 2:
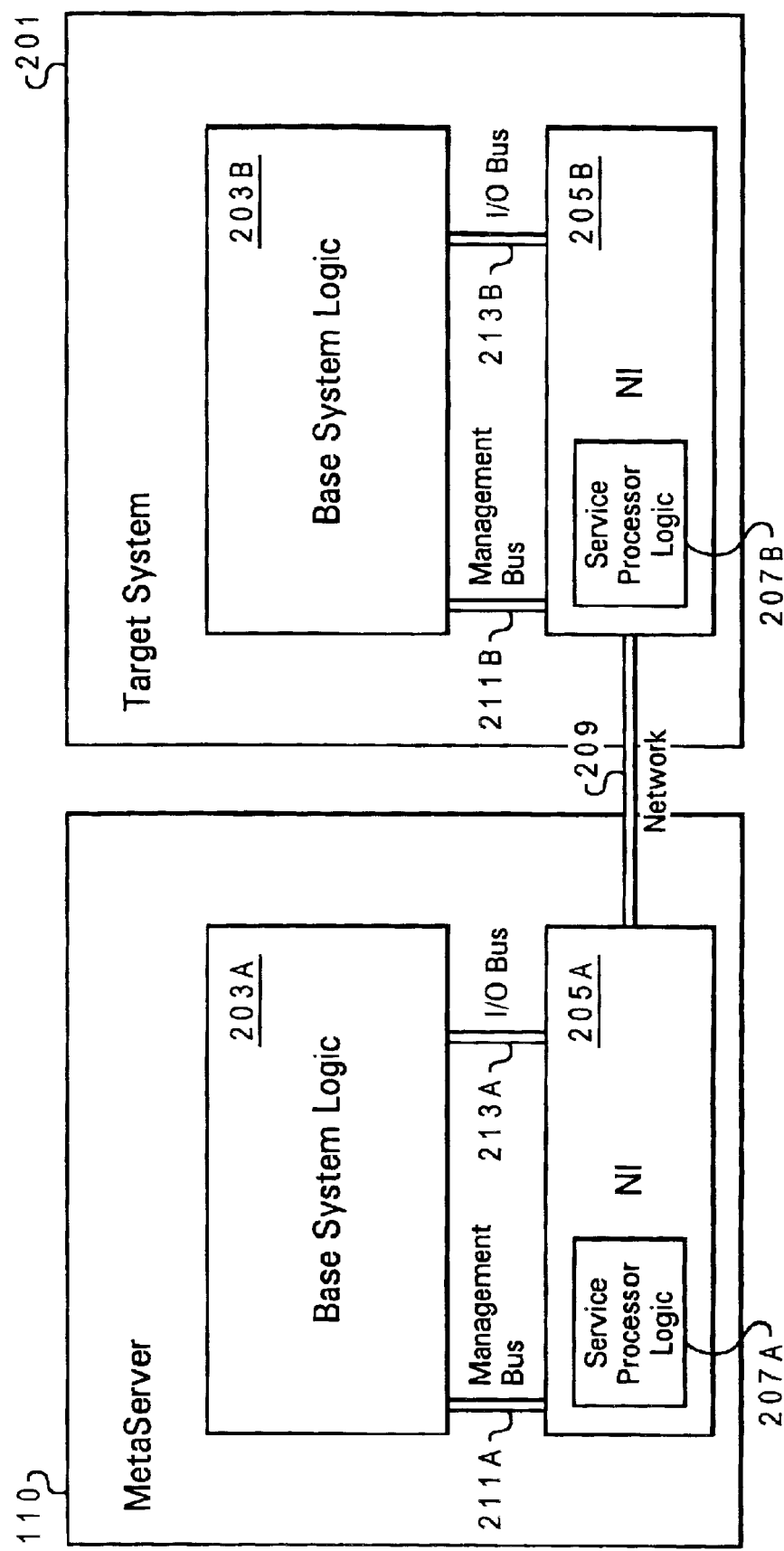
FIG. 2 illustrates a block diagram of the combined service processor and network interface logic on a programmable network interface card within a management server appliance or MetaServer and a target managed server in accordance with an embodiment of the present invention.

FIG. 2 illustrates the combined service processor-network interface embodiment. Both a management server appliance or MetaServer 101 and a target managed system 201 are illustrated. MetaServer 101 and target managed system 201 respectively are comprised of base system logic 203A, 203B and a network interface 205A, 205B within which is programmed the service processor logic 207A, 207B. Network interfaces 205A, 205B are connected to base system logic 203A, 203B via management busses 211A, 211B and I/O busses 213A, 213B. Network interface 205A is connected to the network interface 205B through standard network connection technology 209 such as an ethernet switch. The details of connection technology 209 vary depending on the nature of the network interfaces 205A, 205B used.

Thus, rather than having separate implementations of the network interface logic and the service processor logic, the invention combines the features of both components into a single implementation utilizing a single processor, single memory, single software structure and a single set of network connections and signaling logic. The combined implementation has a single implementation of the hardware and software to power the servers on and off as well as a single interface to the software that runs on the main processor(s) of each server.

In order to provide all of the function required by standard specifications such as Intel's Wired for Management 2.0 and the related Intelligent Platform Management Interface Specification, the present invention revises some network interface connections to server logic. In particular, the programmable network interface card (or functional equivalent) is provided with a connection to the management bus on the server planar such as, for example, the Intelligent Platform Management Bus, which is the extended $I^2C$ bus for management specified by the Intel standards.

In a second embodiment, rather than combining all of the network interface and service processor logic into a single logic element, two separate blocks of programmable logic are maintained (i.e., the logic blocks are re-partitioned). One block of logic is dedicated solely to the network interface and another block is dedicated to service-processor-related monitoring and control functions. In the re-partitioned embodiment, all of the external interface and network-related functions found in current service processor implementations are moved to the network interface logic while management-related functions such as the system start-up, invoked by wake-on-LAN, are moved to the service processor logic.

Figure 3:
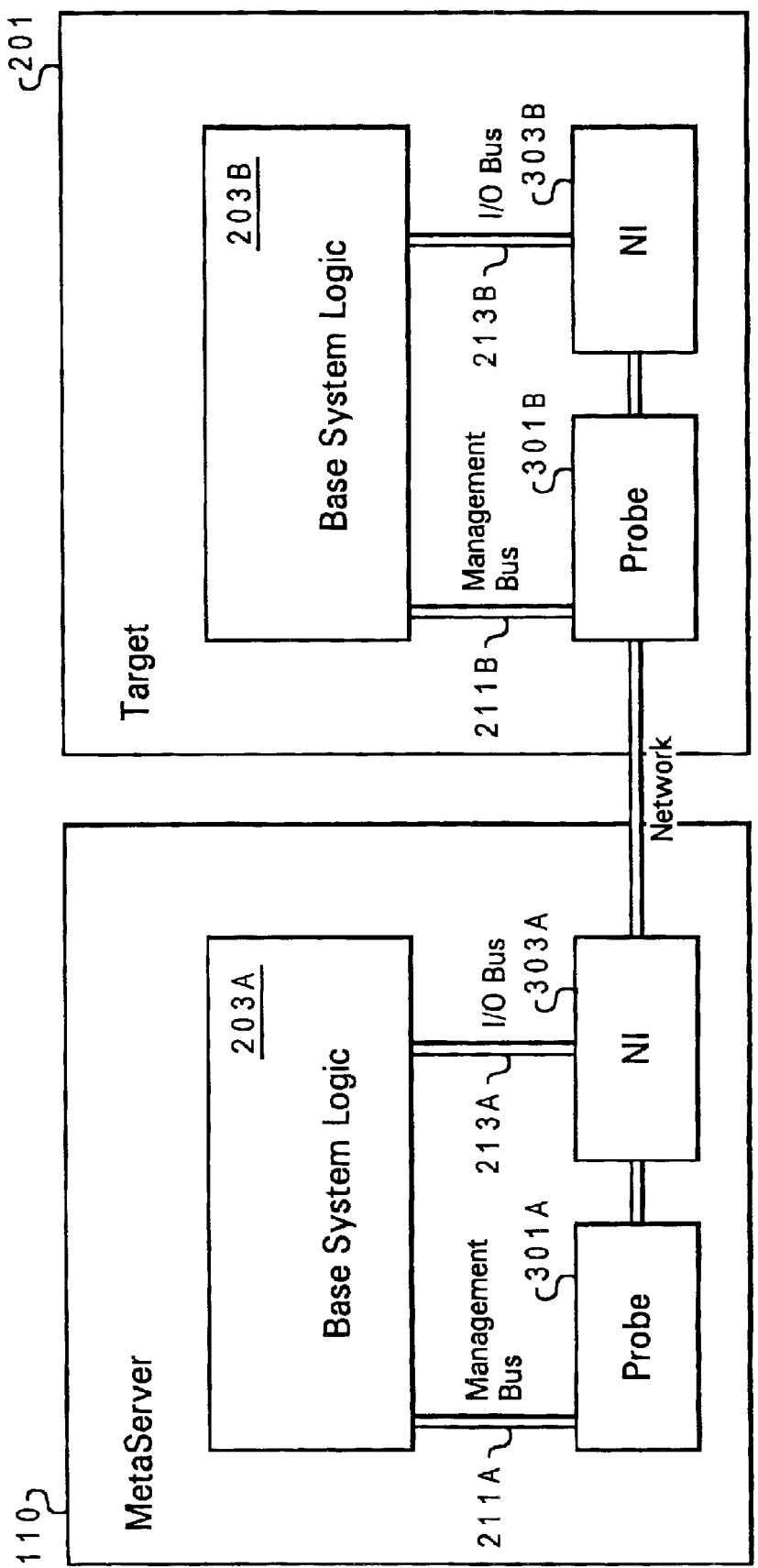
FIG. 3 illustrates a block diagram of the re-partitioned functions of a service processor and network interface of a programmable network interface card according to another embodiment of the present invention.

FIG. 3 illustrates one implementation of the re-partitioned logic blocks. The FIG. 3 components that are similar to FIG. 2 have been previously described above. Single network interfaces 205A, 205B of FIG. 2 are replaced with separate service processor logic (or probe) 301A, 301B and network interface logic 303A, 303B. With the re-partitioned embodiment, management busses 211A, 211B connect to probes 301A, 301B, while I/O busses 213A, 213B connect to network interfaces 303A, 303B. Probes 301A, 301B and network interfaces 303A, 303B are interconnected within MetaServer 101 and target server 201, respectively.

The probes 301A, 301B illustrated in FIG. 3 are not, or at least, may not necessarily be, a full service processor implementation minus the networking function. In one embodiment, the probes 301A, 301B are simple controllers that act as local monitoring and control points within each server.

The invention offers a comprehensive approach for replacing pairs of network interface cards and standard service processors with programmable network interface cards. The invention as described herein allows either a complete replacement of all service processor logic by the programmable network interface or a re-partitioning of functions to separate the network interface functions of ordinary and management traffic from any system-management-related functions, namely those historically performed by network interface cards, from those performed by service processor cards. Also, the invention replaces hardware service processors with programming that executes on the network interface logic.

The invention thus offers two primary developments: (1) minimizing the overall performance impact of management;

and (2) reducing the total cost of the system. Additionally, the invention improves upon the hardware that currently exists to support systems management by reducing the amount of special-purpose hardware required.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission media such as digital and analog communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of reducing hardware and software redundancy in server systems, said method comprising the steps of:
    identifying specific management functions provided by a service processor;
    programming a programmable network interface card with logic to complete said specific management functions along with standard network interface functions; and
    connecting the programmable network interface card to an I/O bus, a management bus and a network.

2. The method of claim 1, further comprising the steps of:
    connecting said programmable network interface card to a base system logic of an associated server via the I/O bus and the management bus to provide said logic with access to management and control information; and
    utilizing a single network connection of said programmable network interface card as a communication port from said server to a network for the communication of both standard input/output data and management data.

3. The method of claim 1, wherein said specific management functions of said identifying and programming steps are selected from among:
    gathering sensor data about the hardware;
    forwarding alerts regarding hardware state;
    initiating shutdown and restart on command; and
    responding to operating system service processor inquiries and commands.

4. The method of claim 3, further comprising the steps of adding low-level functionality to said specific management functions from among:
    low-level network statistics gathering;
    low-level network liveness testing and failure detection; and
    forwarding of information gathered from the operating system and application subsystem software including the generation of software alerts.

5. The method of claim 1, wherein said programming step includes:
    re-partitioning network interface logic and service processor logic on said programmable network interface card; and
    programming said service processor logic as a controller logic that operates as a local control point for a remote management system.

6. A network server comprising:
    a base system logic; and
    a programmable network interface card coupled to said base system logic via an I/O bus and a management bus, wherein said programmable network interface card comprises both network interface logic and service processor logic required to complete multiple functions from among hardware monitoring and control functions including:
        gathering sensor data about the hardware;
        forwarding alerts regarding hardware state;
        initiating shutdown and restart on command; and
        responding to operating system service processor inquiries and commands.

7. The network server of claim 6, wherein said base system logic includes a processor and a memory component.

8. The network server of claim 6, wherein said service processor logic and said network interface logic are a single component.

9. The network server of claim 6, wherein said service processor logic comprises control logic that operates as a local control point for a remote management system when said network server is connected to a network which includes said management System.

10. The network server of claim 6, wherein said programmable network interface card further comprises a network port for connecting said network server to an external network and which provides transmission of bath input/output and management functions and data to and from said network server.

11. A server farm environment comprising:
    a first server and a second server, wherein each server comprises a programmable network interface card that provides both network interface and service processor functions; and
    means for interconnecting said first server and said second server via said network interface cards;
    wherein at least one of said network interface cards is programmed with service processor logic required to complete multiple functions from among hardware monitoring and control functions including:
        gathering sensor data about the hardware;
        forwarding alerts regarding hardware state;
        initiating shutdown and restart on command; and
        responding to operating system service processor inquiries and commands.

12. The server farm environment of claim 11, wherein said interconnecting means is a single wired connection from an input/output (I/O) port of a first programmable network interface card of said first server through a single, physical, standard network connection to the I/O port of a second programmable network interface card of said second server, and enables communication of both management and input/output functions and data between said first and said second servers.

13. The server farm environment of claim 12, wherein said first server is a management server and said second server is a target managed server.

14. The server farm environment of claim 13, wherein said programmable network interface card comprises combined network interface logic and service processor logic.

15. The server farm environment of claim 13, wherein said programmable network interface card comprises re-partitioned network interface logic and service processor logic.

16. The server farm environment of claim 15, wherein said re-partitioned service processor logic provides a controller that operates as a local monitoring and control point for a remote management system.

17. The server farm environment of claim 13, wherein said multiple functions further include low-level functions from among:
- low-level network statistics gathering, low-level network liveness testing and failure detection; and
- forwarding of information gathered from the operating system and application subsystem software including the generation of software alerts.

18. The server farm environment of claim 11, wherein each of said first and second server comprises a base system logic wherein said network interface card is coupled to said base system logic via a management bus that provides management and control information to and from said base system logic and an I/O bus that provides basic application I/O functions to and from said base system logic.

19. A computer program product comprising:

a computer readable medium; and program instructions on said computer readable medium for implementing software aspects of a network interface and providing management and control functionality of a service processor, from among:

gathering sensor data about the hardware; forwarding alerts regarding hardware state; initiating shutdown and restart on command;

responding to operating system service processor inquiries and commands;

low-level network statistics gathering; and low-level network liveness testing and failure detection; and forwarding of information gathered from the operating system and application subsystem software including the generation of software alerts.

* * * * *